United States Patent [19]

Van Siclen, Jr.

[11] 4,380,224

[45] Apr. 19, 1983

[54] IGNITION SYSTEM FOR AN INTERNAL COMBUSTION ENGINE

[75] Inventor: Howard E. Van Siclen, Jr., Unadilla, N.Y.

[73] Assignee: The Bendix Corporation, Southfield, Mich.

[21] Appl. No.: 288,720

[22] Filed: Jul. 31, 1981

[51] Int. Cl.³ .............................................. F02P 5/04
[52] U.S. Cl. .................... 123/602; 123/605; 123/648; 315/209 SC
[58] Field of Search ............... 123/602, 605, 612, 596, 123/599, 648, 418; 305/209 SC, 209 CD

[56] References Cited

U.S. PATENT DOCUMENTS

| | | | |
|---|---|---|---|
| 3,714,507 | 1/1973 | Schweitzer et al. | 315/209 SC |
| 3,952,715 | 4/1976 | Van Siclen, Jr. | 123/602 |
| 4,132,208 | 1/1979 | Yukawa | 315/209 SC |
| 4,232,646 | 11/1980 | Asai | 123/605 |
| 4,335,692 | 6/1982 | Miura | 123/602 |

Primary Examiner—Parshotam S. Lall
Attorney, Agent, or Firm—Raymond J. Eifler

[57] ABSTRACT

An ignition system for an internal combustion engine that provides automatically advanced timing over a predetermined range of engine speeds. The ignition system includes a timing circuit (100) that controls the resistance and hence voltage across a capacitor (53) that biases a switch in the trigger circuit (50) of the system. The transistor (125) is operated in its active region so that the transistor (125) operates as a variable resistor. As the resistance of the transistor (125) decreases with increasing engine speed the timing of the system advances. The predetermined speed at which the advance begins is determined by zener diode (119) in series with the base of the transistor (125). The maximum advance of the system is limited by a resistor (94) in series between the transistor (125) and the capacitor (53) of the trigger circuit (50). The transistor (125) is operated in its active region by a transistorized circuit that receives its power from the main storage capacitor (27) of the ignition system.

9 Claims, 2 Drawing Figures

IGNITION SYSTEM FOR AN INTERNAL COMBUSTION ENGINE

This invention relates to an ignition system for an internal combustion engine and more specifically to a timing circuit within the ignition system that changes the time in the operating cycle of the engine that electrical energy is supplied to a spark plug.

An ignition system for an internal combustion engine generates timing pulses, which indicate the instant during the piston stroke that the spark plug should be fired, and distributes these pulses to the individual spark plugs to cause them to fire in a preset order. One example of an ignition system that advances the timing of an ignition system upon an increase in engine speed may be found in U.S. Pat. No. 3,240,198 issued Mar. 15, 1966 and entitled "Electrical Apparatus". An electromagnetic pulse generator used with such a system may be found in U.S. Pat. No. 3,252,024, issued May 17, 1966 and entitled "Electrical Apparatus". An improvement to such an ignition system may be found in U.S. Pat. No. 3,952,715 issued Apr. 27, 1976 and entitled "Variable and Constant Timing for Breakerless Ignition". This last patent discloses a pulse generating system for controlling spark timing in which timing is advanced with increased engine speed and changed independently of engine speed by a voltage biasing means. The triggering circuit in the system may be controlled manually by varying a resistor or controlled by a computer to provide any desired spark timing. Not disclosed in U.S. Pat. No. 3,952,715 is a circuit that replaces the manually operated resistor for automatically controlling the timing or the suggested computerized circuit. Another circuit that abruptly changes the voltage applied to the base of a transistor to advance the timing of an ignition system is shown in U.S. Pat. No. 4,178,892, issued Dec. 18, 1979 and entitled "Speed Dependent Ignition Time Advancement Apparatus in Magneto Generator Ignition Systems". None of the foregoing timing circuits operate a transistor in its active region so that the transistor operates as a variable resistor over a predetermined range of engine speeds.

DISCLOSURE OF THE INVENTION

This invention provides a circuit for automatically advancing the timing of an ignition system over a predetermined range of engine speeds. The invention is characterized by a timing circuit which initiates a timing change above a predetermined engine speed by operating a transistor in its active region as a resistor. The transistor is in parallel with a capacitor that is in series with and biases the gate of an SCR switch that controls the discharge of energy from a main storage capacitor through a spark plug in response to trigger pulses timed to the engine. The resistance of the transistor operating in its active region, decreases with increasing engine speed to advance the timing of the system. As the resistance of the transistor decreases, the capacitor, biasing the SCR switch, discharges to a lower voltage level permitting trigger pulses to pass through to trigger ON the SCR switch at a lower level. The predetermined speed at which the advance begins is determined by a Zener diode in series with the base of the transistor. The Zener diode does not conduct until the charge on another capacitor reaches a predetermined voltage which corresponds to the predetermined engine speed.

DETAILED DESCRIPTION OF THE INVENTION

Figure 1:
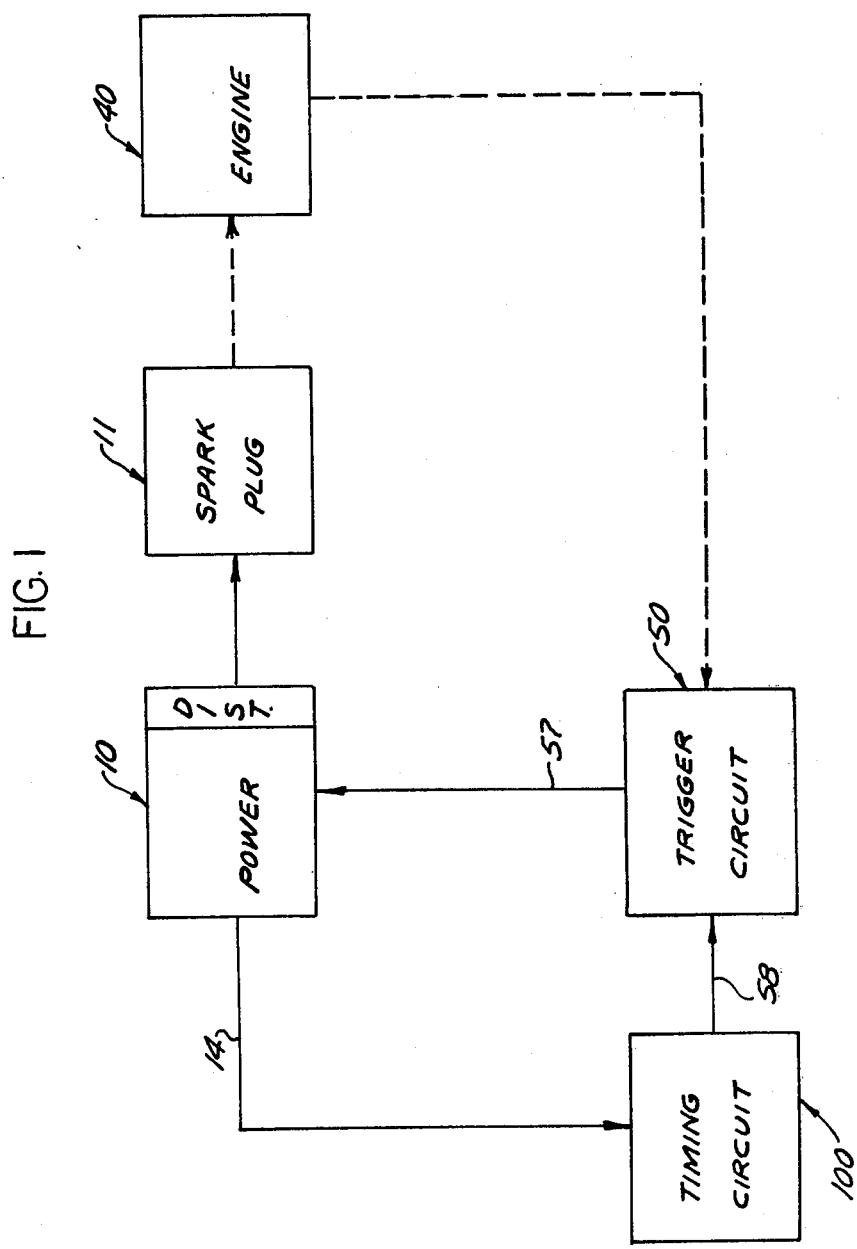
FIG. 1 is a block diagram of the ignition system shown in FIG. 2.

Referring now to the drawings, FIG. 1 illustrates a block diagram of an ignition system that includes a power section 10; a spark plug 11 for receiving power and for igniting fuel in an internal combustion engine 40; a trigger circuit 50 for generating trigger pulses and suppling them to the power section 10 to release electrical energy to the spark plug 11 in timed relation to the operating cycle of the engine 40; and a timing circuit 100 for advancing the time that the trigger circuit releases the electrical energy from the power circuit 10 to the spark plug 11. Where there is more than one spark plug the power circuitry 10 includes a distributor to distribute the energy release to each spark plug in the proper sequence in the operating cycle of the engine 40.

Figure 2:
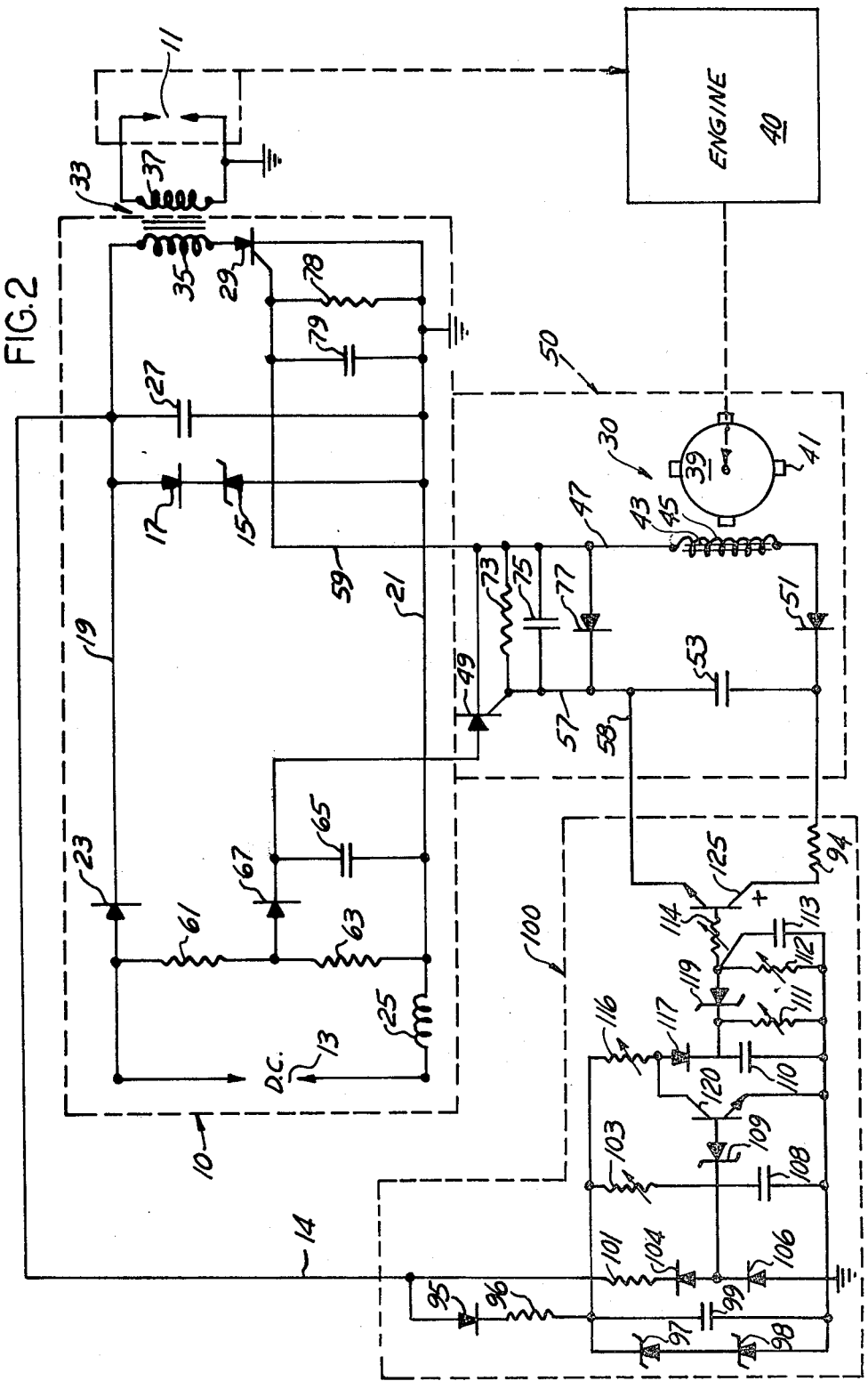
FIG. 2 is a schematic diagram of an ignition system embodying the principles of this invention.

FIG. 2 illustrates an ignition system constructed according to the invention for supplying timed spark discharges from spark plug 11 to an internal combustion engine 40. Any number of spark plugs 11 may be used and electrical energy may be distributed to the spark plugs in timed relation to the engine through a distributor (not shown) as described in U.S. Pat. No. 3,240,198.

Direct current power 13 for the system may be supplied by a magneto or generator through a full wave rectifier or any other suitable source such as a battery. The voltage may also be regulated by Zener diode 15 and diode 17 connected in series across leads 19 and 21. Lead 19 is connected to source 13 through a diode 23 and lead 21 is connected to source 13 through an inductor 25. A main storage capacitor 27 connected between leads 19 and 21 is periodically charged by DC source 13 through diode 23 and inductor 25. Capacitor 27 discharges when a silicon controlled rectifier 29 is triggered to conduct by a triggering pulse from trigger circuit 50. The capacitor 27 upon discharging will provide sufficient energy through transformer 33, which has a primary winding 35 connected in series with silicon controlled rectifier 29 across leads 19 and 21 and a secondary winding 37 connected in series with spark plug 11, to provide a suitable spark plug at spark plug 11.

An electromagnetic pulse generator, similar to that shown in U.S. Pat. No. 3,252,024 is shown generally as 30. The generator includes a trigger wheel 39 having a plurality of projections or vanes 41 equal to the number of spark plugs 11 and is rotated by the crankshaft of engine 40. The vanes 41 of trigger wheel 39, when rotated, pass through the flux of a permanent magnet 43, having a pickup coil 45 wound thereon. Each time a vane 41 passes through the flux of the permanent magnet a pulse is generated in pickup coil 45. The amplitude of each pulse increases with an increase in the speed of trigger wheel 39. One end of coil 45 is connected through a lead 47 to the cathode of a silicon controlled rectifier 49. The other end of coil 45 is connected through a diode 51 and capacitor 53, to the gate of SCR 49 by a lead 57. Capacitor 53 is the means for supplying a voltage bias in the gate of SCR 49. The novel timing circuit 100 of the invention is connected in parallel with capacitor 53 to control the voltage to which capacitor 53 discharges to between trigger pulses and hence control the bias on the gate of SCR 49. The cathode of SCR 49 is also connected to the gate of SCR 29 through a lead 59. A diode 77 is connected across leads 47 and 57 to keep the reverse gate to cathode voltage at a low value.

A voltage divider including resistors 61 and 63, is connected across leads 19, 21. A capacitor 65 is connected to lead 21 through a diode 67 to the junction of resistor 61 and 63. The capacitor 65 is also connected to the anode SCR 49. Each time a trigger pulse is generated in pickup coil 45, SCR 49 is turned on discharging capacitor 65 through SCR 49, and the gate of SCR 29 to fire spark plug 11.

Radio frequency suppression may be provided for SCR 49 by a resistor 73 and a capacitor 75 connected in parallel between leads 47 and 57 across the gate to cathode circuit of the SCR 49. Similarly, RF suppression may be provided for SCR 29 by a resistor 78 and a capacitor 79 connected in parallel between leads 59 and 29 across the gate of cathode circuit of SCR 29.

The ignition circuit operates as follows: capacitor 65 and 27 are fully charged by DC source 13 between successive pulses generated in pickup coil 45. When the gate of SCR 49 reaches its threshold voltage in response to a pulse from pickup coil 45, the SCR 49 conducts and capacitor 65 discharges through the SCR 49 to provide a pulse through the gate of SCR 29 so that it conducts and discharges capacitor 27 through the primary winding 35 of transformer 33. This induces a high voltage at secondary winding 37 causing a spark discharge across the gap of spark plug 11. The timing of the spark discharge in the engine cycle is determined by the amplitude of the trigger pulse from the electromagnetic pulse generating means 30 and the voltage on capacitor 53 at the time the trigger pulse is generated. In the present embodiment the voltage on capacitor 53 is determined by the amplitude of the trigger pulse and by the value of the resistance of transistor 125 of timing circuit 100. A trigger pulse upon gating SCR 49 charges capacitor 53 to a voltage corresponding to the amplitude of the trigger pulse and, in the interval between trigger pulses, the capacitor 53 discharges through timing circuit 100 to a voltage determined by the resistance value of transistor 125. A trigger pulse from the generator 30 gates SCR 49 ON when its amplitude exceeds the voltage capacitor 53 had discharged to in the interval between pulses.

Timing circuit 100 controls the discharging of capacitor 53 by transistor 125. Transistor 125 is actuated by switching transistor 120 to operate in its active region (as a resistor) over a predetermined range of engine speeds so that its resistance is not substantially a constant value during a portion of its operation. When the resistance of the transistor decreases, and capacitor 53 discharges to a lower level permitting trigger pulses from the generator 30 to pass to SCR 49 at a lower voltage level. This triggers SCR 49 ON earlier in the operating cycle of the engine, hence advancing the timing. The timing circuit 100 is powered from the main tank capacitor 27 through lead 14. In operation capacitor 108 charges to a predetermined level until an ignition pulse occurs. When the main storage capacitor 27 discharges to zero, capacitor 108 also discharges to zero through resistor 101 and diode 104. Diode 106 keeps the reverse voltage on C108 to a consistent voltage level such as 0.5 volts. As the main tank capacitor 27 is recharged, capacitor 108 also is recharged. So long as capacitor 108 is charging capacitor 110 also charges. However, when capacitor 108 reaches a predetermined level, transistor 120, turns ON removing the charge on capacitor 110 which discharges through resistor 111. For a constant speed or a constant time between ignition pulses the charge on capacitor 110 reaches an average voltage level.

As the speed of the engine increases, the time between the ignition pulses decreases. However, the charge time of capacitor 108 and therefore of capacitor 110 remains constant. The discharge time of capacitor 110 decreases causing a higher level of average voltage on capacitor 110. At a predetermined speed, the average voltage level of capacitor 110 increases and Zener diode 119 conducts. Zener diode 119 conducts until the voltage on capacitor 110 drops below the voltage level of Zener diode 119. When Zener 119 conducts it provides current to operate transistor 125 in its active region so that some of the current from the trigger pulse by passes capacitor 53 causing the ignition pulse to occur earlier (advance). As speed increases, the current to transistor 125 from Zener diode 119 increases driving transistor 125 further into its active region (lowering its resistance) thereby bypassing more of the current from the trigger pulse generator 39 and further advancing the ignition pulse. Resistors 103, 116, 111, 112 and 114 may be varied to change the slope of the charge on capacitor 111 and, therefore, change the advance of the timing pulse with speed to fit a desired curve. Resistor 125, in the collector circuit of transistor 125, limits the amount of advance in the circuit. Resistor 96 and Zener diodes 97 and 98, diode 95 and capacitor 99 provide voltage regulation for capacitor 108.

The following is the table of values for the circuit components of timing circuit 100.

| COMPONENT VALUES | | |
|---|---|---|
| Resistor 101-1K | Diode 104 | IN4004 |
| Resistor 103-4.7M | Diode 106 | IN4004 |
| Resistor 111-620K | Diode 109 | 24 volts |
| Resistor 112-470K | Diode 117 | IN4004 |
| Resistor 114-4.7M | Diode 119 | 24 volts |
| Resistor 116-2M | Transistor 120 | GES 5828 |
| Capacitor 108-.01mf | Transistor 120 | GES 5828 |
| Capacitor 110-.47mf | | |
| Capacitor 113-.49mf | | |

While a preferred embodiment of this invention has been disclosed, it will be apparent to those skilled in the art, that changes may be made to the invention as set forth in the appended claims, and in some instances, certain features of the invention may be used to advantage without corresponding use of other features. For instance, the value of resistor 103 and capacitor 108 could be changed to change the speed at which the timing advance became operative. Accordingly, it is intended that the illustrative and descriptive materials herein be used to illustrate the principles of the invention and not to limit the scope thereof.

Having described the invention, what is claimed is:

1. In combination with a internal combustion engine ignition system having at least one spark plug, means for firing the spark plug including a first solid state electronic switching device, and a triggering circuit for switching the first electronic switching device for firing the spark plug comprising: a second solid state electronic switching device, pulse generating means for generating a succession of electrical trigger pulses in timed relation to the speed of the engine crankshaft to trigger the second switching device electrically conductive which switches the first switching device conductive, means for biasing the second switching device, and means for automatically controlling the voltage of the bias means, the improvement wherein the means for controlling the bias means comprises:

a transistor connected in parallel with said voltage biasing means; and means for operating said transistor in the active region of its operating characteristics wherein its resistance varies.

2. The ignition system recited in claim 1 wherein the bias means comprises a capacitor.

3. The ignition system recited in claims 1 or 2 wherein the means for operating said transistor in the active region comprises:

means for receiving electrical energy from said ignition system and means for providing an output signal to said transistor above a predetermined voltage level.

4. The ignition system as recited in claim 3 wherein said output signal varies as a function of engine crankshaft speed.

5. The ignition system recited in claim 3 wherein said means for providing an output signal above a predetermined voltage level comprises:

a Zener diode in series with the base of said transistor, said Zener diode operative to conduct at said predetermined voltage.

6. The ignition system recited in claim 1 or 2 including a resistor in series between the transistor and the biasing means to limit the maximum advance of the system.

7. An internal combustion engine ignition system including at least one spark plug, means for firing the spark plug including a first solid state electronic switching device, and a triggering circuit for switching the first electronic switching device for firing the spark plug comprising: a second solid state electronic device, electromagnetic pulse generating means for generating a succession of electrical trigger pulses in timed relation to the operating cycle of the engine and which increase in amplitude with an increase in engine speed to make the second switching device electronically conductive for switching the first device, voltage bias means connected between the pulse generating means and the second switching device to advance with increase in engine speed the time in the engine cycle the second switching device is made conducting, and means for controlling the voltage of the bias means independently of pulse amplitude to control the time in the engine cycle the second switching device is conducting to control spark timing, the means for controlling the voltage on the bias means being connected in parallel with the bias means and including:

a transisitor connected in parallel with said voltage biasing means; and means for operating said transistor in the active region of its operating characteristics wherein its circuit resistance varies during operation of the engine.

8. The ignition system recited in claim 7 wherein said biasing means is a capacitor.

9. An ignition system for an internal combustion engine comprising: at least one spark plug, means for firing the spark plug including a first solid-state electronic switching device and a triggering circuit for switching the first electronic switching device, said triggering circuit comprising a second solid-state electronic switching device having a gate circuit, electromagnetic pulse generating means for generating a succession of electrical trigger pulses in timed relation to the operating cycle of the engine and which increase in amplitude with an increase in engine speed to make said second switching device electrically conductive to switch said first switching device, and means for preventing a portion of the trigger pulses from going to said second switching device and for varying the portion of the trigger pulse going to the second switching device, said means for preventing and varying the portion of the pulse going to the second switching device comprising:

a parallel circuit comprised of a transistor connected in parallel with a capacitor, said parallel circuit connected to the gate circuit of said second solid state switching device; and means for operating said transistor in the active region of its operating characteristics wherein its circuit resistance varies during its operation.

* * * * *